(12) United States Patent
Carpi et al.

(10) Patent No.: US 12,297,904 B2
(45) Date of Patent: May 13, 2025

(54) STAND-ALONE, SELF-PURGING, HOLLOW-PISTON HYDRAULIC ACTUATOR

(71) Applicant: DANA ITALIA S.R.L., Trentino (IT)

(72) Inventors: Davide Carpi, Caluso (IT); Pier Paolo Rinaldi, Trentino (IT); Giacomo Faggiani, Rovereto (IT)

(73) Assignee: DANA ITALIA S.R.L., Arco (IT)

( * ) Notice: Subject to any disclaimer, the term of this patent is extended or adjusted under 35 U.S.C. 154(b) by 154 days.

(21) Appl. No.: 18/172,942

(22) Filed: Feb. 22, 2023

(65) Prior Publication Data
US 2024/0280172 A1    Aug. 22, 2024

(51) Int. Cl.
*F16H 61/30* (2006.01)
*F16H 63/30* (2006.01)

(52) U.S. Cl.
CPC ......... *F16H 61/30* (2013.01); *F16H 63/3023* (2013.01); *F16H 2061/308* (2013.01)

(58) Field of Classification Search
CPC .......... F16H 2061/308; F16H 63/2023; F16H 2061/301; F16H 61/30
See application file for complete search history.

(56) References Cited

U.S. PATENT DOCUMENTS

| | | | | |
|---|---|---|---|---|
| 6,019,011 A | * | 2/2000 | Monette | F16H 61/0276 137/625.69 |
| 7,591,352 B2 | * | 9/2009 | Hanawa | F16F 9/464 188/266.6 |
| 2009/0308193 A1 | * | 12/2009 | Bader | F16H 63/3023 74/473.11 |
| 2021/0108656 A1 | * | 4/2021 | Poux | F15B 11/048 |

FOREIGN PATENT DOCUMENTS

| | | |
|---|---|---|
| CN | 108834407 B | 5/2021 |
| EP | 0476996 A2 | 3/1992 |
| EP | 1662171 A2 | 5/2006 |
| FR | 2841310 A1 | 12/2003 |
| JP | 4299329 B2 | 7/2009 |

* cited by examiner

*Primary Examiner* — Jake Cook
(74) *Attorney, Agent, or Firm* — McCoy Russell LLP

(57) ABSTRACT

A stand-alone block, comprising: a hydraulic cylinder and one or more valves, wherein one or more adduction lines between the valve and the hydraulic cylinder are configured to allow the hydraulic cylinder to be self-purging. The hydraulic cylinder drives and guides a hollow piston, wherein a pass-through hole of the piston is configured to host a rod axially aligned with respect to a centerline of the hollow piston, wherein the hollow piston has a radial clearance formed between an inner surface of the hollow piston and the rod.

20 Claims, 10 Drawing Sheets

STAND-ALONE, SELF-PURGING, HOLLOW-PISTON HYDRAULIC ACTUATOR

TECHNICAL FIELD

The present description relates to a hydraulic actuator that can be a stand-alone actuator relative to a transmission. The actuator may incorporate a cylinder for a piston and a valve block in a single unit.

BACKGROUND AND SUMMARY

Vehicles may include a drive train with a transmission. The transmission may include a gear box with plurality of reduction sets, such as gear sets formed of a plurality of gears. In order to select a reduction set, a shifting rod may be actuated by an actuator to drivingly couple the reduction set to a shaft. The actuator may be double-acting and formed of a cylinder about a piston. Hydraulic power may be converted into mechanical power via the piston. The actuator may be positioned in and housed by the transmission.

Machining of the cylinder and cavity on the housing can be complex. For this reason, a dedicated valve block as a separate component from the actuator may be used. Such arrangements often demand increasing a length of adduction lines used to supply the actuator with fluid. In some examples, increasing the adduction line length may contribute to increased formation of pockets of air or other gases therein that can hamper system controllability. The adduction lines may be purged to remove the pockets of air via a separate action from actuation of the piston; however, purging interrupts and slows the actuation of the piston. The piston may also be rigidly coupled to the shifting rod, acting more as a single part rather than two. Tilting loads that the shifting rod receives when operating the fork may result in piston misalignment with the cylinder, wherein the piston becomes approximately un-centered and misaligned with respect to the central axis of the cylinder. Misalignment may cause a seal or plurality of seals and plugs of the cylinder to experience uneven forces and contact. Such processes may cause degradation to and leakage of actuating fluid from components of the cylinder, such as the seals and/or plugs. Moreover, the connection of the valve block to the rest of the transmission is a potential source of actuation fluid leakage. Additionally, it may be challenging to test the functionality of the actuator formed or machined into the transmission without assembling the transmission.

The inventors herein have recognized these and other issues with such systems. In an example, at least some of these issues may be addressed by a stand-alone block, comprising: a hydraulic cylinder and one or more valves, wherein one or more adduction lines between the valve and the hydraulic cylinder are configured to allow the hydraulic cylinder to be self-purging. The hydraulic cylinder may drive and guide a hollow piston, wherein a pass-through hole of the piston is configured to host a rod axially aligned with respect to a centerline of the hollow piston. The hollow piston has a radial clearance formed between an inner surface of the hollow piston and the rod.

In an example, the hydraulic cylinder and valves are incorporated into the same block, referred to as a valve block. The valve block may be stand-alone from the transmission, wherein the valve block may be assembled and operated independently of the transmission. The adduction lines to drive the piston the cylinder may be formed within the valve block. The piston may have a clearance formed between the inner surface of the piston and the shifting rod. Having the hydraulic cylinder enclosed and the valves fluidly coupled to the same block may shorten the adduction line and may reduce the quantity of sealing members for sealing between the block and the rest of the transmission.

Further, incorporating the hydraulic cylinder and valves into a single valve block may increase the ease of installation and assembly of the valve block. Additionally, the valve block, the piston, and other components of the actuator may be tested independently without assembling the housing and or other components of the transmission. Incorporating the adduction lines into the valve block may reduce the chances of leakage of actuation fluid and degradation from external forces to the adduction lines. Additionally, the lengths and volumes of the adduction lines may be decreased when incorporated into the valve block relative to adduction lines external to a valve block and hydraulic cylinder. The reduced length and volume of the adduction lines may allow for the adduction lines to be self-purging, removing gas pockets formed in the adduction lines with each actuation of the piston. The clearance between the inner surface of the piston and the shifting rod may reduce the piston from becoming misaligned with respect to the plugs and seals of the cylinder. With the clearance, the shifting rod may not be guided by the piston and may be guided solely by the components of housing of a transmission, such as a centering spigot. As the shifting rod experiences deflection and becomes un-centered from a central axis of the cylinder due to external forces, the piston may remain centered on the central axis. The clearance and constant centering of the piston, may allow the manufacturing tolerance to be relaxed, reducing manufacturing time and scrap while increasing the ease of assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
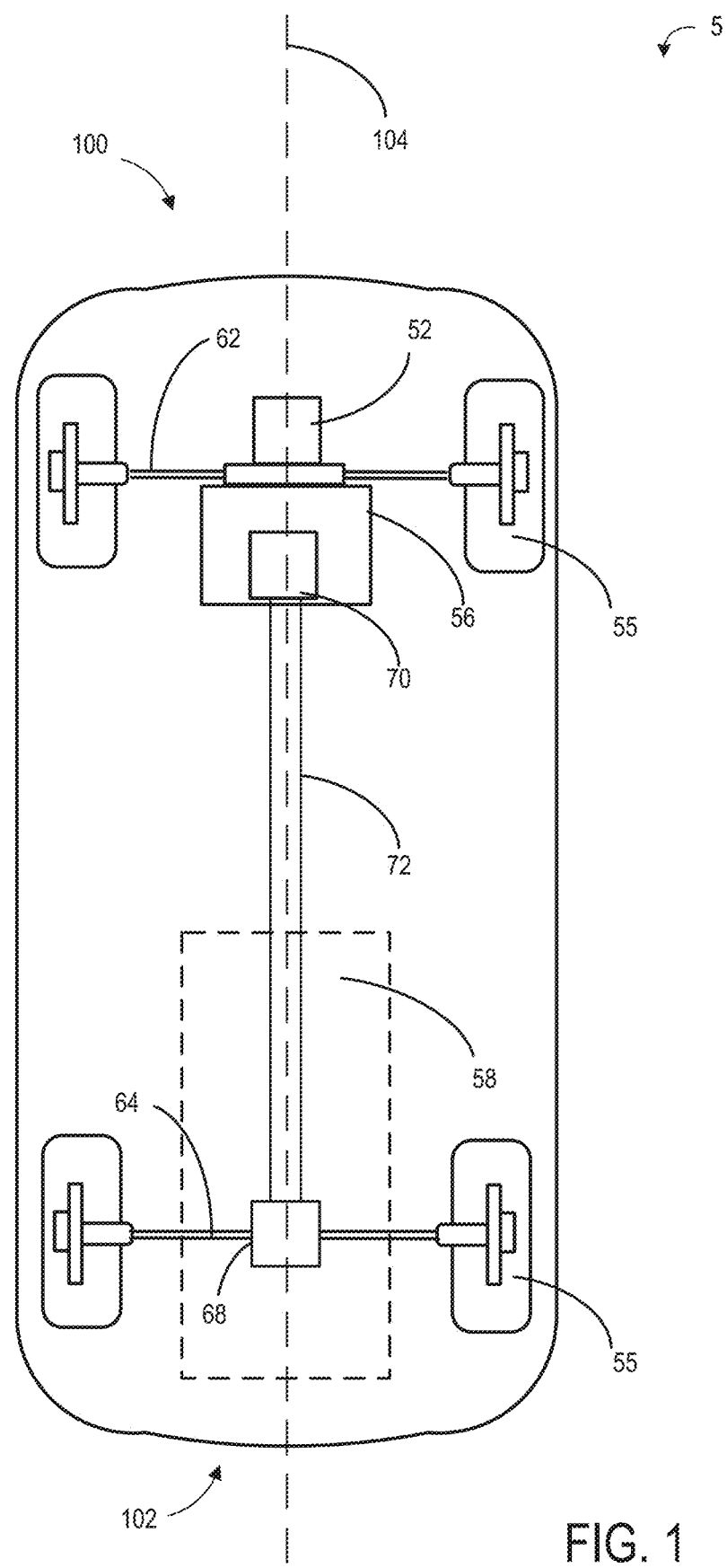
FIG. 1 shows an example schematic of a vehicle that may include a gear box and transmission.

The description relates to an actuator, such as a transmission actuator, that may be used to translate a rod or shaft, such as shifting rod. The actuator may be hydraulic, wherein the actuator converts hydraulic power into mechanical power via a cylinder and piston. The actuator may be double-acting, wherein actuation fluid, such as oil, may act on either side of the piston, actuating the piston in a first or a second direction. The rod may be coupled to a plurality of sleeves. The sleeves may be coupled to a synchronizer or dog clutch used to shift the ratio of a gear set or another form of reduction set. The actuator may be located on an enclosure, such as a gear box and/or transmission, within a vehicle.

The actuator may be comprised of housing about the piston, wherein the housing is separate from the housing or material of the transmission. The housing may form the cylinder located about a piston. The housing of the actuator may be a valve block, wherein the actuator and valve block are incorporated into a single unit. The cylinder may be incorporated into a hole, or bore. The hole extends through the material and has two mouths on opposite surfaces of the valve block. The hole may have multiple portions that are approximately cylindrical in shape and of different diameters. For example, the hole may be defined by an inner surface extending through the housing, and an opening on a first exterior surface of the housing and an opening, on an opposing, second exterior surface of the housing. A diameter of the hole may be variable throughout the length and may include multiple diameters for fitting various components, such as seals, to secure the cylinder The actuator may be stand-alone, wherein the actuator may operate outside of and when not drivingly coupled to a gear box or a transmission. The piston may couple to the rod or shaft via a clip that is ring like in shape and extends radially from the rod or shaft. The clip may be referred to as circular clip or circlip. The rod or shaft may be guided by a component of housing of the transmission. A clearance between the rod and actuator may allow the rod to become un-centered while the piston may remain centered on the central axis. The clearance and constant centering of the piston, may allow the manufacturing tolerance to be relaxed, reducing manufacturing time and scrap while increasing the ease of assembly of the actuator.

A single or a plurality of valves may be used to change pressure in the valve block and actuate the piston. Each of the valves may be solenoid valves, such as solenoid pressure proportional valves. A plurality of passages may be formed and incorporated into the valve block. The passages may couple the valve or valves to the cylinder and/or other passages. The valve block may be connected and fluidly coupled to the actuator via passages in the form of adduction lines. The adduction lines may be passages that deliver fluid to the cylinder of the actuator. An adduction line may be of a volume no more than ten percent of the volume displaced by full stroke of the actuator. The volume of the adduction line relative to the actuator displacement may allow the adduction line to be self-purging of pockets of air, other gasses, or contaminants that may build up in the adduction line and the cylinder.

Figure 2A:
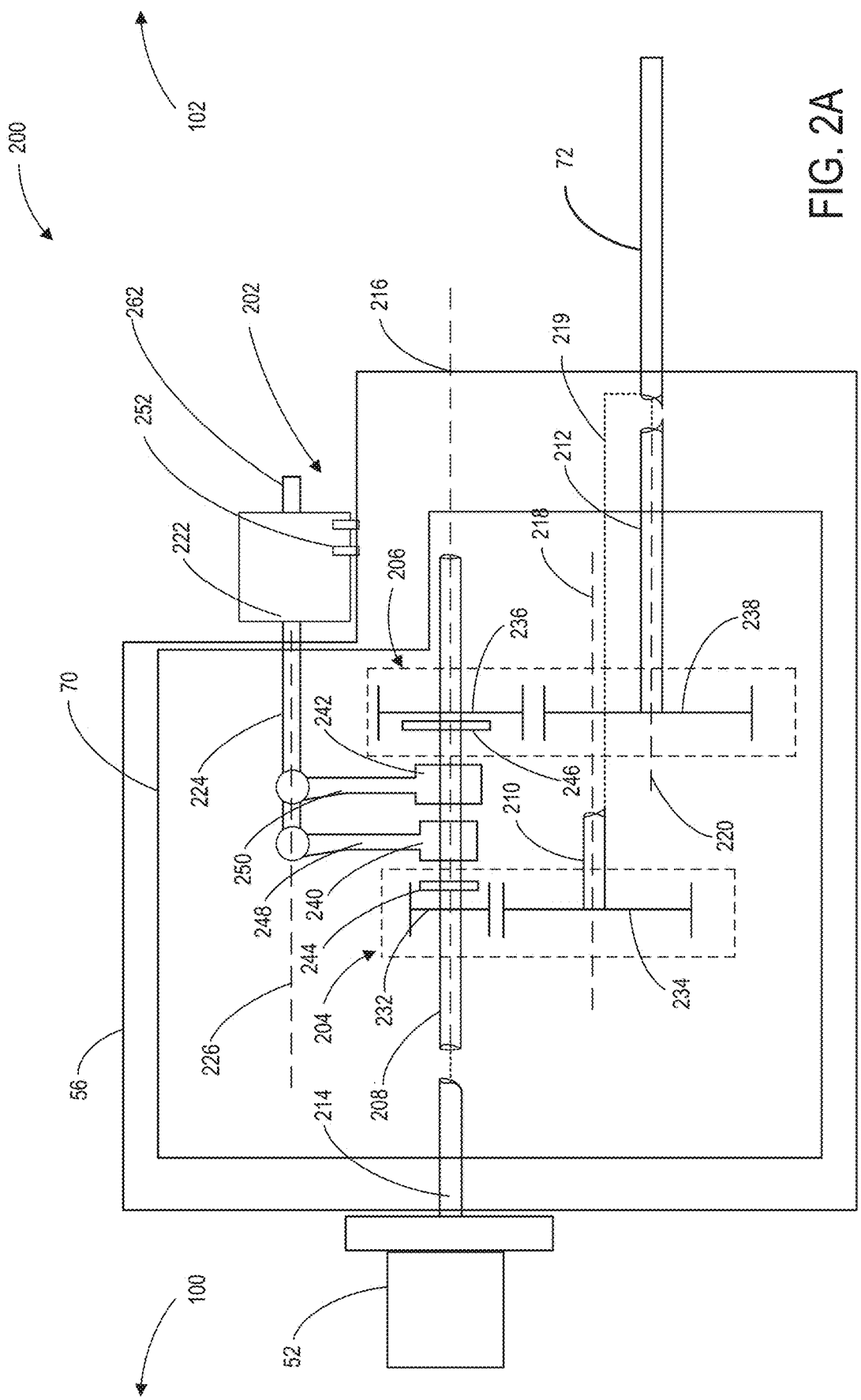
FIG. 2A shows an example schematic of the actuator and components of the shifting rod within the gear box and transmission.
Figure 2B:
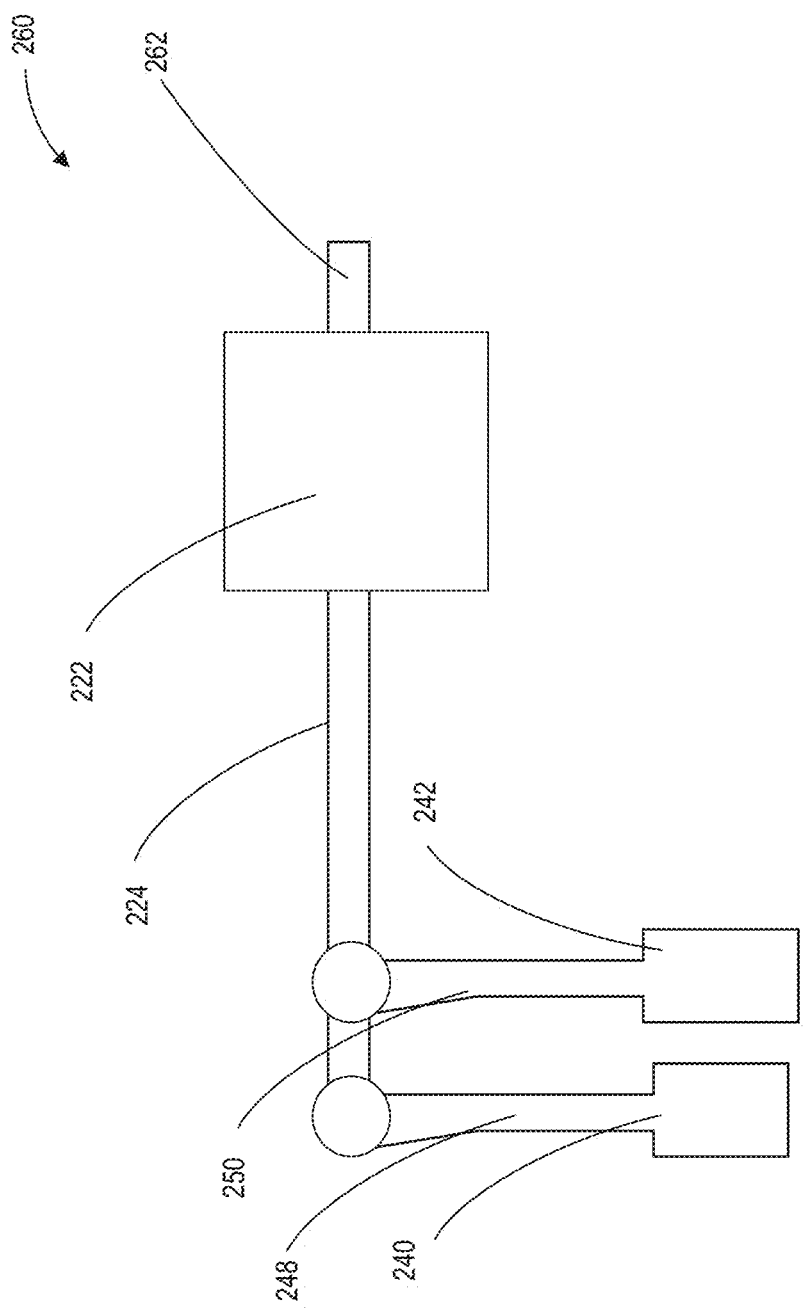
FIG. 2B shows an example schematic of the actuator and components of the shifting rod isolated.
Figure 3A:
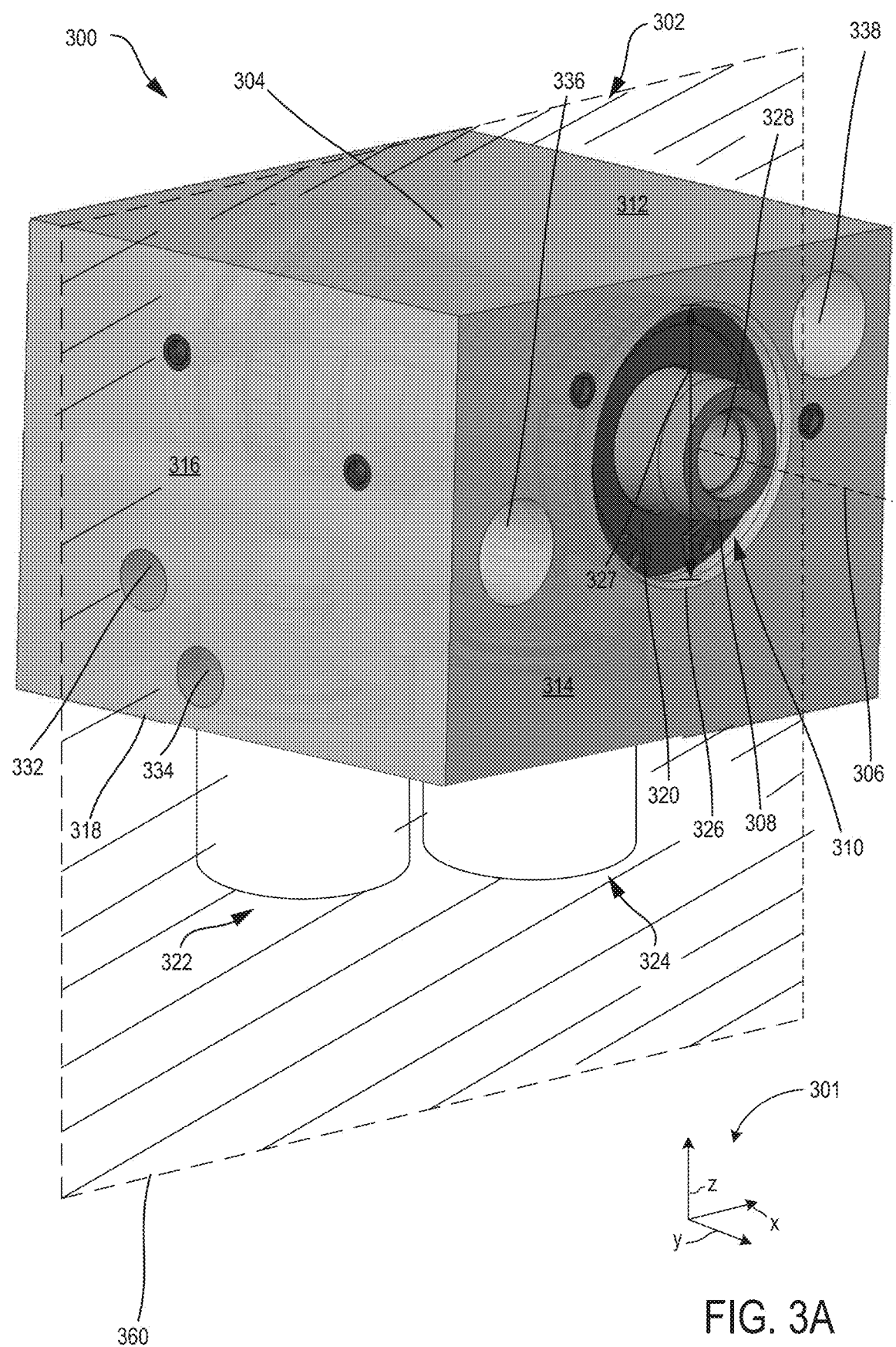
FIG. 3A shows a first isometric view of an actuator.
Figure 3B:
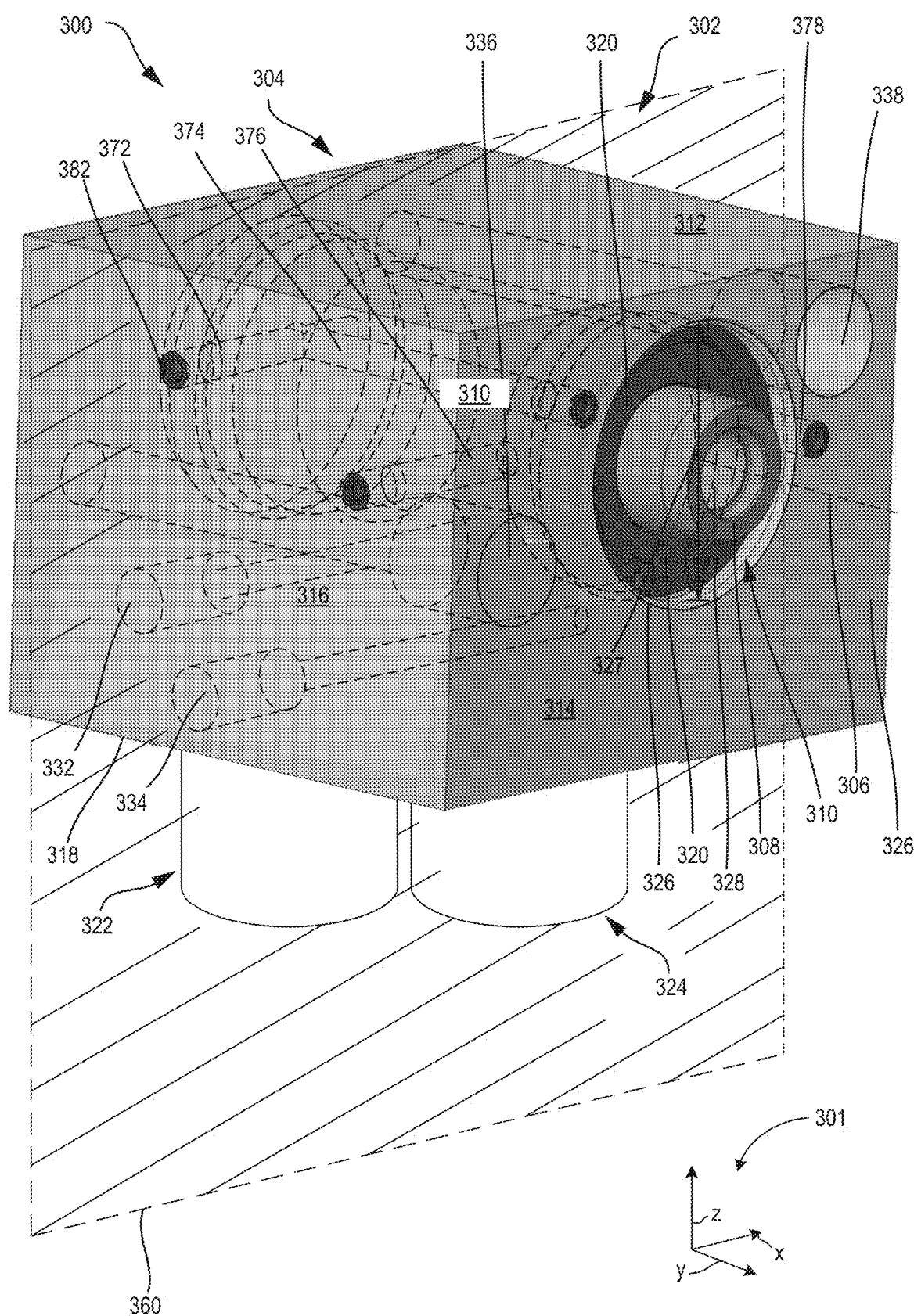
FIG. 3B shows the first isometric view of the actuator of FIG. 3A with internal passages and other components.
Figure 4:
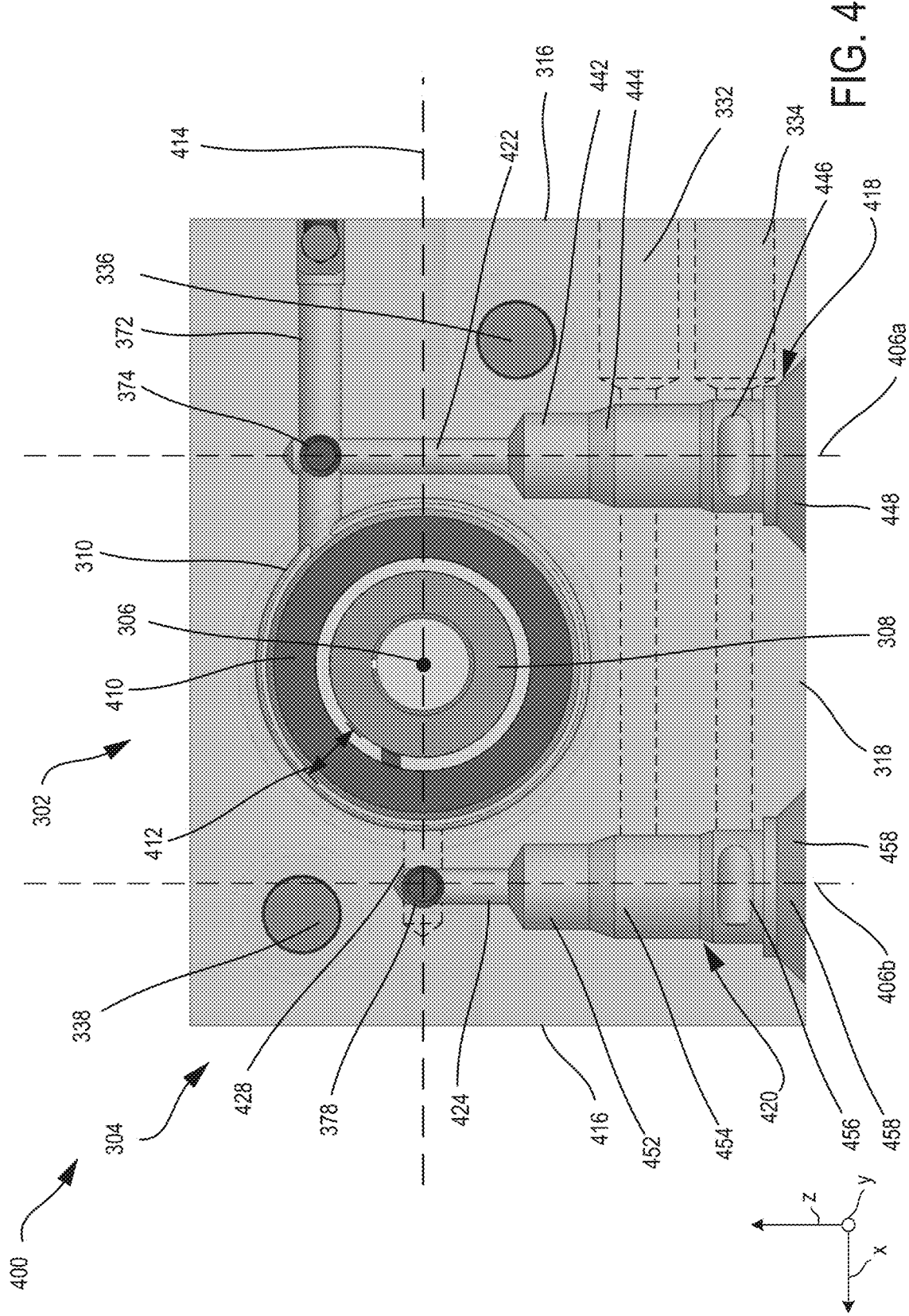
FIG. 4 shows a first sectional view of the actuator of FIG. 3A taken on a plane in FIGS. 3A-B.
Figure 5:
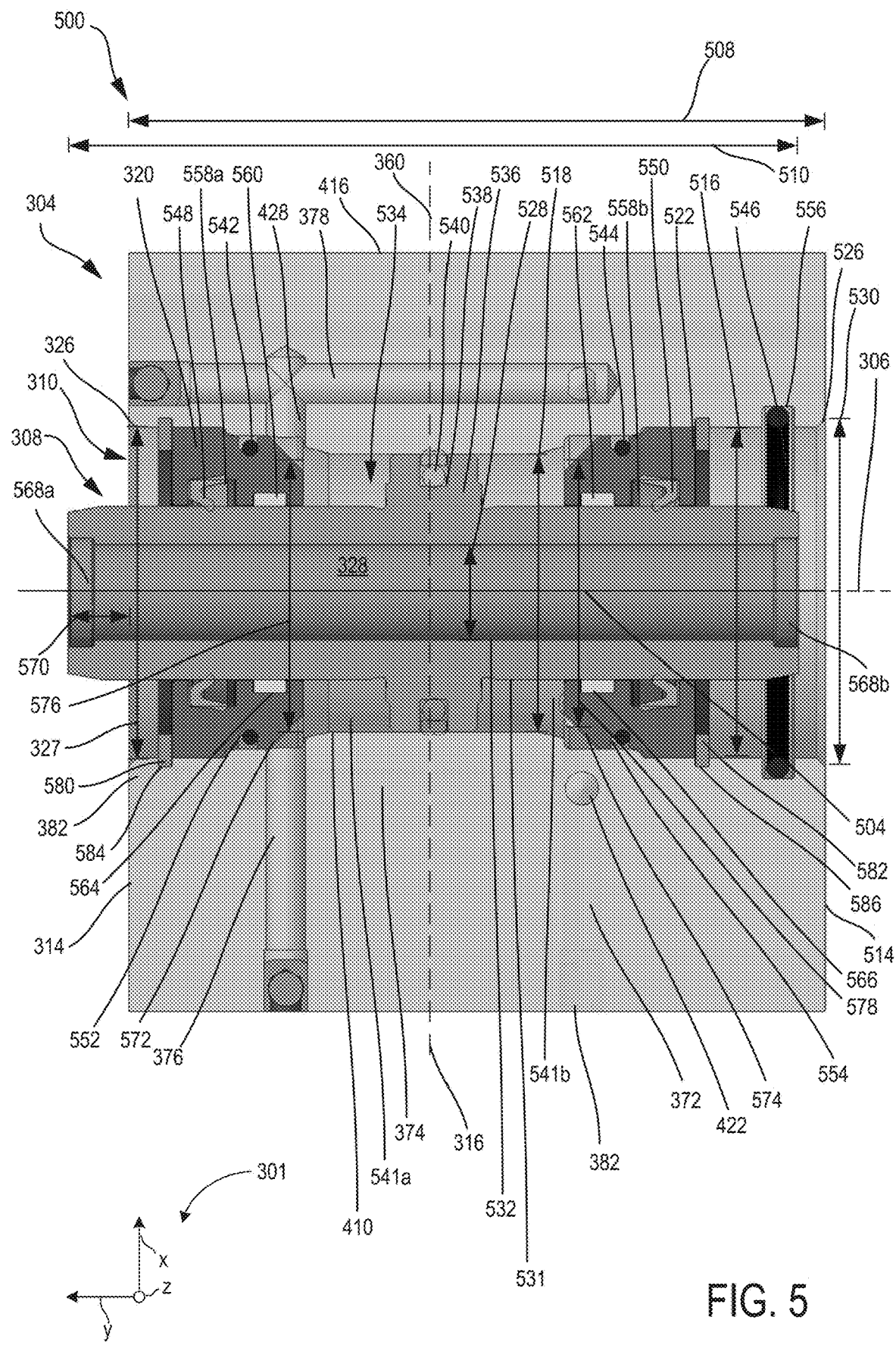
FIG. 5 shows a second sectional view of the actuator of FIG. 3A taken on a line in FIG. 4.
Figure 6A:
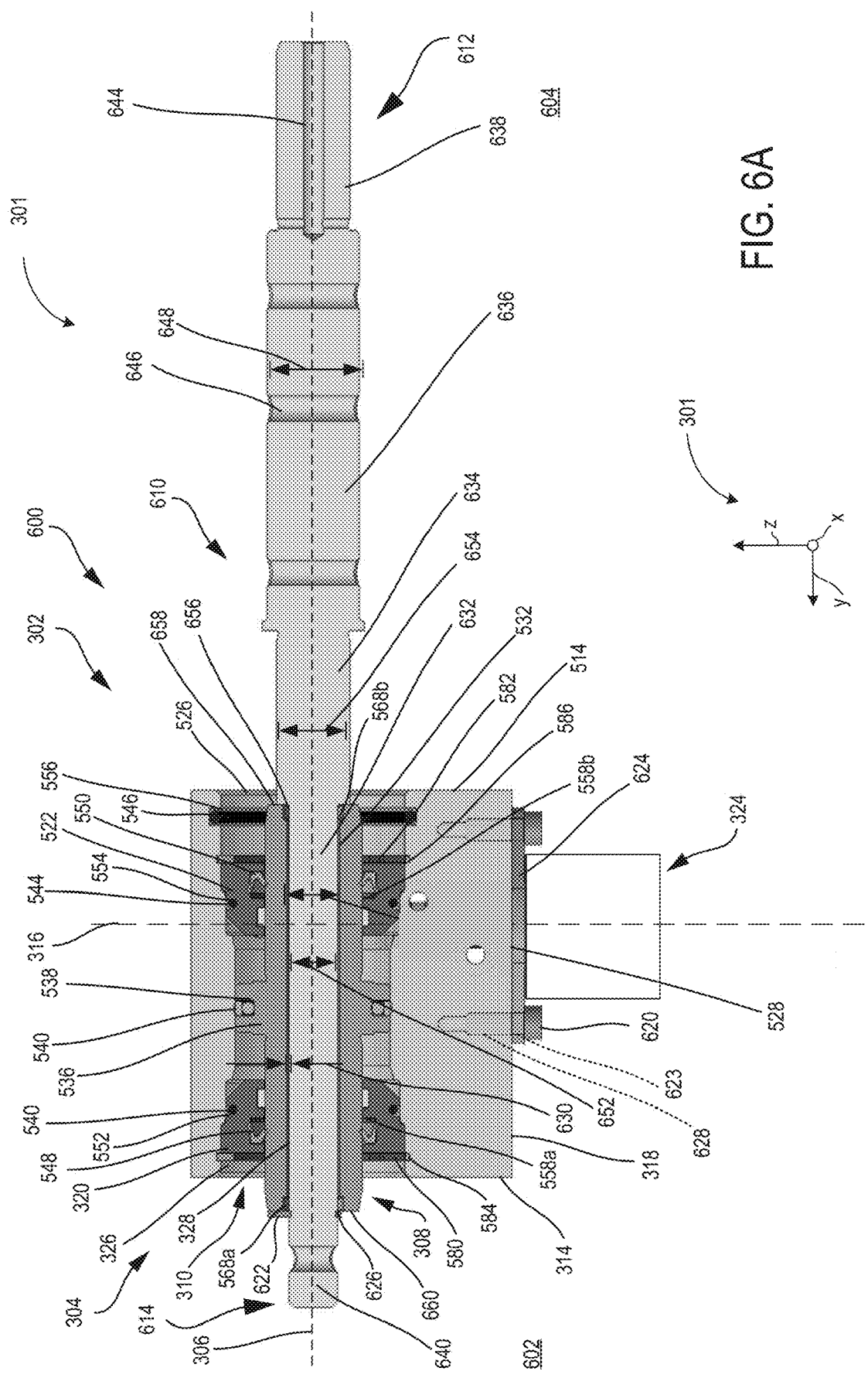
FIG. 6A shows a third sectional view of the actuator of FIG. 3A coupled to a rod taken on a line in FIG. 5.
Figure 6B:
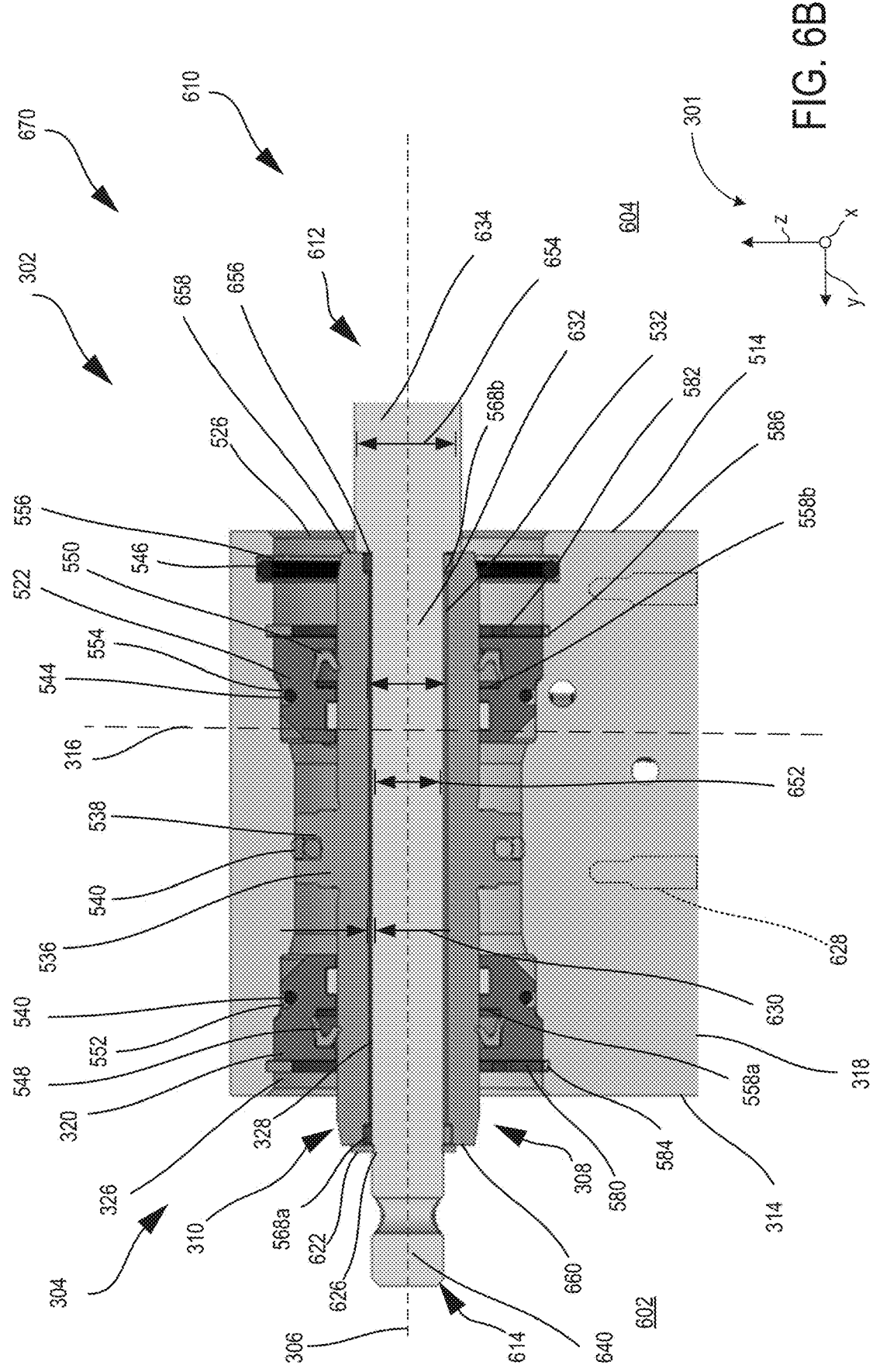
FIG. 6B shows a fourth sectional view of the actuator of FIG. 3A coupled to a rod taken on a line in FIG. 5. from a closer position.
Figure 7:
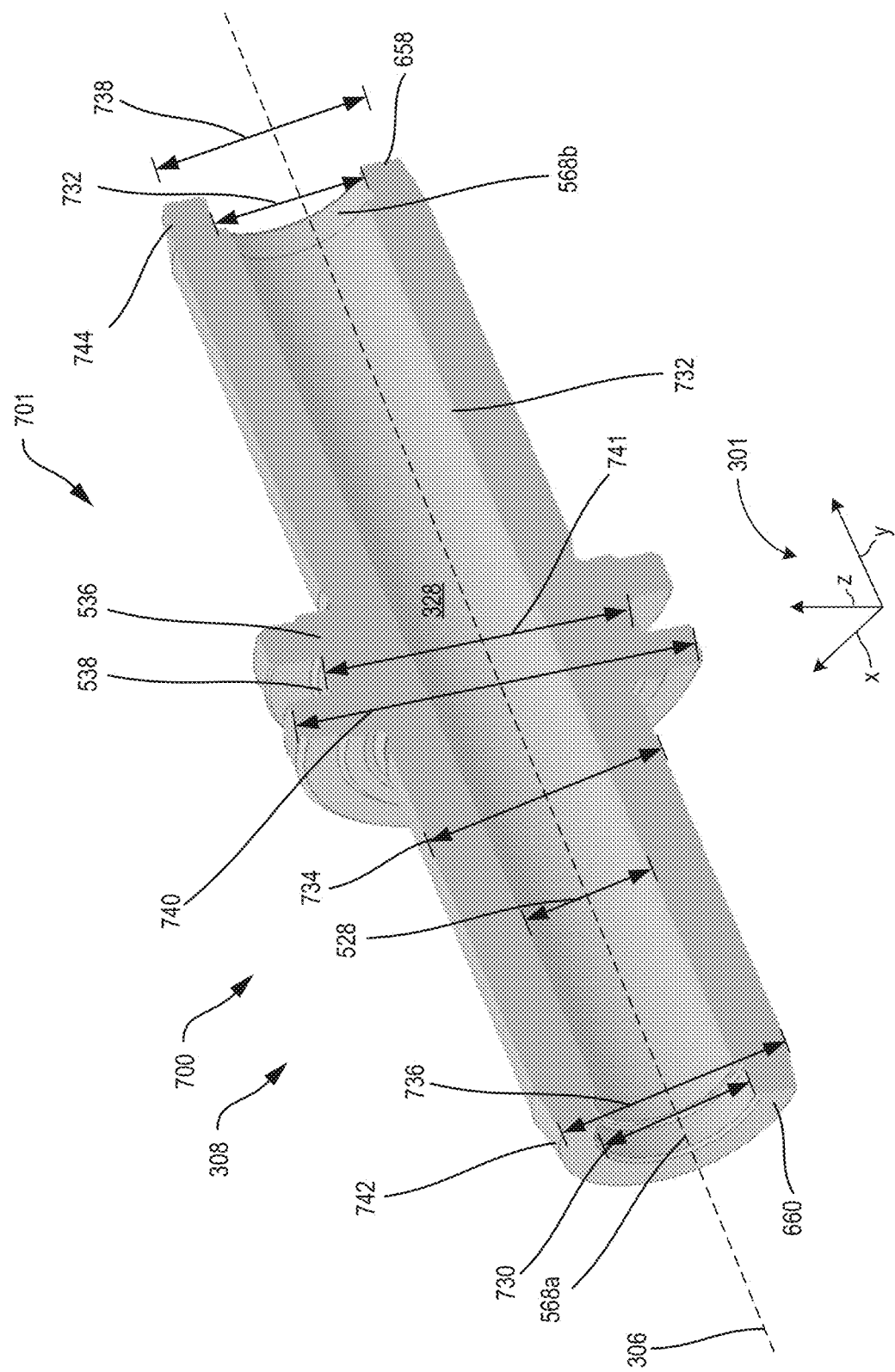
FIG. 7 shows a second isometric view of a section of an isolated and sectioned piston.

A schematic of a vehicle is shown in FIG. 1. The vehicle includes a transmission that may contain an example gear box of the present disclosure as well as components, such as wheels, the gear box may affect. A schematic of an enclosure within a transmission and a gear box is shown in FIG. 2A. The schematic of FIG. 2A also shows an actuator of the present disclosure that may drivingly couple to a first reduction set or a second reduction set. FIG. 2B shows the actuator and drivingly coupled components isolated from the transmission and gear box of FIG. 2A. In FIG. 2B the actuator may be in a state of testing or another operation where the actuator may function as stand-alone. FIG. 3A shows an isometric view of an actuator formed of a valve block and piston. The valve block may act as a housing for the piston and be fluidly coupled to a single or a plurality of valves. FIG. 3B shows the isometric view of the actuator from FIG. 3A with internal components and features, such as passages for actuation fluid and the hole the piston may be housed in. FIG. 4 shows a first sectional view of the actuator of FIG. 3A taken on a plane from FIGS. 3A-B. FIG. 4 shows the internal components of the two valves fluidly coupled to the valve block and hole. FIG. 5 shows a second sectional view of the actuator of FIG. 3A taken on a line in FIG. 4. FIG. 6A shows a third sectional view of the actuator of FIG. 3A coupled to a rod taken on a line from FIG. 5. FIG. 6A shows a clearance between the rod and actuator and a clip used to couple the rod to the actuator. FIG. 6B shows a fourth sectional view of the actuator of FIG. 3A coupled to a rod taken on a line in FIG. 5 from a closer position. FIG. 7 shows a second isometric view of a section of an isolated and sectioned piston.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced. FIGS. 1-2 show schematics of example configurations with relative positioning of the various components. Herein, when the vehicle is positioned on level ground, vertical is shown with respect to gravity. FIGS. 3A-7 are shown approximately to scale, although other relative dimensions may be used. As used herein, the terms "approximately" is construed to mean plus or minus five percent of the range unless otherwise specified.

Further, FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Turning to FIG. 1, an example vehicle 5 is shown. The vehicle 5 may have a front end 100 and a rear end 102, and may be bisected into approximately symmetrical halves by a longitudinal axis 104.

In some examples, vehicle 5 may be a hybrid vehicle with multiple sources of torque available to one or more vehicle wheels 55. Alternatively, the vehicle 5 may include solely an internal combustion engine. In other examples, vehicle 5 may be an all-electric vehicle, powered exclusively by an energy storage device such as a battery 58.

In the example shown, vehicle 5 includes a prime mover 52. In one example the prime mover 52 may be an engine, such as an internal combustion engine. For this example, the prime mover 52 may receive a fuel such as gasoline or diesel to combust, converting chemical energy from the fuel into rotational energy.

In other examples, the prime mover 52 may be an electric machine, which may be an electric motor, an electric motor/generator, or an electric motor/engine. The prime mover 52 may receive electrical power from the battery 58 that is converted to rotational energy, e.g., torque, at a transmission 56. The transmission 56 may be a planetary transmission with a gear set including at least one sun gear surrounded by and meshed with a plurality of planet gears. The torque may be delivered to vehicle wheels 55, including a set of front wheels proximate to a front end 100 of vehicle 5 and a set of rear wheels proximate to a rear end 102 of vehicle 5. The prime mover 52 may also be operated as a generator to provide electrical power to charge the battery 58, for example, during a braking operation.

The prime mover 52 provides rotational energy to the wheels of vehicle 5 via the transmission 56. The wheels 55 may be drivingly coupled to the vehicle 5 and/or the transmission via a first axle 62 and a second axle 64. For this example, vehicle 5 has the first axle 62 proximate to the front end 100 and the second axle 64 proximate to the rear end 102. For this example, vehicle 5 has the prime mover 52 and the transmission 56 positioned in the front end 100 of vehicle 5. A gearbox 70 is incorporated into the transmission 56 providing the transmission 56 with different gears to select via a clutch. For this example, the prime mover 52 and the transmission 56 may provide rotational energy to a drive shaft 72 to transfer rotational energy to a differential 68 to rotate the wheels 55 positioned in the rear end 102. It will be appreciated that in other examples, rotational energy may be alternatively provided to the wheels 55 located near the front end 100 of vehicle 5. Furthermore, in other examples, each of the wheels 55 near the front end 100 and the wheels 55 near the rear end 102 may be coupled to individual transmissions, such as when vehicle 5 is configured with all-wheel drive. As well, in other embodiments, transmission 56 and/or prime mover 52 may be arranged closer to the rear end 102 of vehicle 5 rather than the front end 100.

The battery 58 may be between the vehicle wheels 55 and closer to the rear end 102 of vehicle 5 than the front end 100. For example, the battery 58 may be positioned below rear passenger seats of the vehicle. In another example, the battery 58 may be located in a floor of a rear compartment of the vehicle or may be integrated into a vehicle chassis. In other examples, however, the battery 58 may be located in a different relative position within vehicle 5 than shown in FIG. 1.

Turning to FIG. 2A, a schematic 200 of the transmission 56 and gearbox 70 illustrated with reference to FIG. 1 is shown. The gearbox 70 may be located within and enclosed by the transmission 56. In one example, the gearbox 70 contains a gear assembly 202. Gearbox 70 may be a multi-stage reduction gearbox with the gear assembly 202 acting as a system of a plurality of reduction sets. The gear assembly 202 may be formed of at least two reduction sets that may reduce the RPM and increase the torque. The reduction sets may be referred to herein as stages. There may be a first stage 204 and second stage 206. The first stage 204 and second stage 206 may be comprised of gears, such as fixed gears.

The gearbox 70 may contain at a first shaft 208, a second shaft 210, and a third shaft 212. The first stage 204 may be supported by the first shaft 208 and the second shaft 210. The second stage 206 may be supported by the first shaft 208 and the third shaft 212. The first shaft 208 may act as an input to the first stage 204 and second stage 206. The second shaft 210 may act as an output for the first stage 204. The third shaft 212 may act as an output for the second stage 206. The first stage 204 may drivingly couple the first shaft 208 to the second shaft 210. The second stage 206 may drivingly couple first shaft 208 to the third shaft 212. The first shaft 208 may be centered on a first axis 216. The second shaft 210 may be centered on a second axis 218. The third shaft 212 may be centered on a third axis 220. The first axis 216, second axis 218, and third axis 220 may be parallel with one another. The first stage 204 may traverse the first axis 216 to the second axis 218. The second stage 206 may traverse the first axis 216 to the third axis 220. The first shaft 208 may drivingly couple a first input shaft to gear assembly 202. For the example shown in schematic 200, the first input shaft may be an output shaft 214 of the prime mover 52. The output shaft 214 may be referred to herein as the prime mover output shaft 214. For this example, the prime mover 52 may be a first electric machine, such as a first electric motor. However, other configurations of the gearbox are possible. For example, the first input shaft may be a shaft drivingly coupled to output shaft 214 or the output of another reduction set. Shafts and other components that may be drivingly coupled but not directly contacting may be represented by dotted lines 219.

The second shaft 210 and third shaft 212 may be drivingly coupled to a first output shaft. For the example shown in schematic 200, the first output shaft may be the drive shaft 72. However, other configurations of the gearbox 70 are possible. For example, the first output shaft may be a shaft drivingly coupled to the drive shaft 72 or to another reduction set.

An actuator 222 may be used to drivingly couple the first stage 204 or second stage 206 to the first shaft 208. An actuator 222 may be drivingly coupled to a shifting rod 224. The actuator 222 may translate the shifting rod 224 along a fourth axis 226. When translated in a first direction, such as toward the front end 100, the shifting rod 224 may drivingly couple the first stage 204 to the first shaft 208. When translated in a second direction, such as toward the rear end 102, the shifting rod 224 may drivingly couple the second stage 206 to the first shaft 208. The shifting rod 224 may be guided by the housing of the transmission 56 and/or gearbox 70.

There may be a plurality of arms and engagements used by the shifting rod 224 and actuator 222 to drivingly couple reduction sets. There may be at least one arm and two engagements drivingly coupled to the shifting rod 224 to select reduction sets. The number of arms and engagements drivingly coupled to the shifting rod 224 may be dependent on the number of reduction sets to engage. The first stage 204 may be drivingly coupled to the first shaft 208 via a first engagement 240 and first coupling 244. Likewise, the second stage 206 be drivingly coupled to the first shaft 208 via a second engagement 242 and second coupling 246. The first engagement 240 and second engagement 242 may be drivingly coupled to the shifting rod 224 via a first arm 248 and second arm 250, respectively.

The first stage 204 and second stage 206 may be formed of a plurality of gears. Both the first stage 204 and second stage 206 may each be formed from at least two gears. For an example, the first stage 204 may be formed of a first gear 232 and a second gear 234. For this example, the second stage 206 may be formed of a third gear 236 and a fourth gear 238. The first coupling 244 and second coupling 246 may be formed or drivingly coupled to the first gear 232 and second gear 234, respectively. The first engagement 240 and first coupling 244 may form a clutch, such as a synchronizer clutch or a dog clutch. The second engagement 242 and second coupling 246 may form a clutch, such as a synchronizer clutch or a dog clutch.

The actuator 222 may be mounted to the transmission 56 or a component of the transmission 56, such as the gearbox 70, by a plurality of fasteners 252, such as screws. At least two fasteners 252 may be used to mount the actuator 222 to the transmission 56 or a component of the transmission 56.

A portion 262 of the shifting rod 224 may extend through and be located on the opposite side of the actuator from the first and second arms 248, 250. The portion 262 may be engaged for emergency manual operations. A neutral position may be selected on the portion 262 of the rod for towing purpose.

FIG. 2B shows as schematic 260 of the actuator 222, the shifting rod 224, the first arm 248, the second arm 250, the first engagement 240, and second engagement 242 isolated from the gearbox 70 and transmission 56. The actuator 222 be operated as a stand-alone sub-system, disconnected from the transmission 56, wherein the actuator 222 and shifting rod 224 may be operated when not enclosed by, mounted to, and/or when not drivingly coupled to the transmission 56 or components of the transmission 56. Being stand-alone allows the actuator 222 to be tested without being assembled into the transmission 56, for example in end of line trials.

A set of reference axes 301 are provided for comparison between views shown in FIGS. 3A-7. The reference axes 301 indicate a y-axis, an x-axis, and a z-axis. In one example, the z-axis may be parallel with a direction of gravity and the x-y plane may be parallel with a horizontal plane that an actuator 302 may rest upon. When referencing direction, positive may refer to in the direction of the arrow of the y-axis, x-axis, and z-axis and negative may refer to in the opposite direction of the arrow of the y-axis, x-axis, and z-axis. A filled circle may represent an arrow and axis facing toward, or positive to, a view. An unfilled circle may represent an arrow and an axis facing away, or negative to, a view.

Turning to FIG. 3A, it shows a first view 300 of an actuator 302. Actuator 302 may be an example of the actuator 222 introduced with reference to FIGS. 2A-B. The actuator 302 may be a stand-alone block that is formed separate from a transmission and/or gearbox, such as the transmission 56 and/or the gearbox 70 illustrated with reference to FIGS. 1-2. The actuator 302 may be mounted or coupled and dismounted or decoupled from a transmission and/or a gearbox. The actuator 302 may be enclosed by and drivingly coupled to a transmission and/or gearbox when operating. The actuator 302 may be external to but drivingly couple to the transmission and/or gearbox when operating. The actuator 302 may be installed into the transmission and/or gearbox and assembled via a minimum number of fasteners. There may be at least two fasteners, such as screws, used to fasten the actuator 302 to a transmission and/or gearbox.

The actuator 302 is stand-alone, and therein may additionally be operated independently of and disconnected from a transmission and/or gearbox when in operation. For example, the actuation of a piston 308 and flow of actuating fluid through valves may be tested by actuator 302 when not enclosed or drivingly coupled to a transmission. Additionally, the actuator 302 may be operated manually, such that when placed in a neutral position a component attached to the piston 308 of the actuator 302 may actuate the piston during operations. For example, the actuator 302 may be manually operated when towing a vehicle the actuator 302 is installed in.

The actuator 302 may be formed by a valve block 304 located about a piston 308. The piston 308 may be hollow and fit to a hole 310. The piston 308 may act as a hollow piston. The valve block 304 may be stand-alone, and therein may be a stand-alone block. As a stand-alone block, the valve block 304 may not be formed from a larger component of a vehicle, such as the transmission housing. Likewise, when stand-alone, the valve block 304 may function independently of components of a vehicle that are separate from the actuator 302, such as the transmission housing.

The piston 308 and hole 310 may be centered about an axis 306. The components of and devices coupled to the piston 308 may be translated axially with respect to the axis 306. Located about the piston and approximately centered on the axis 306 is a first plug 320. The first plug 320 may be fit to the hole 310 and located about the piston 308. The first plug 320 may be centered about the axis 306. The piston 308 may drivingly couple to a rod or shaft.

In one example, the valve block 304 may be approximately the shape of a cube. In another example, the valve block 304 may be approximately the shape of a rectangular prism. For small volumes valve block 304 when semi-finished may be a prism cut from a bar. For high volumes the valve block 304 may be casted in an irregular shape so to minimize the amount of the material. All the other features of the actuator 302 can stand without the regular shape of the valve block 304.

For an example of one embodiment, the valve block may have a first surface 312, a second surface 314, and a third surface 316 visible from first view 300. The first surface 312 may be located on top of the valve block 304. A fourth surface 318 may be formed at the bottom of the valve block 304. Both the first surface 312 and fourth surface 318 may be horizontal, wherein for an example the first surface 312 and fourth surface 318 may be parallel with a plane formed by the x and y-axes. The second and third surfaces 314, 316 may be between the first and fourth surfaces 312, 318. The second and third surfaces 314, 316 may be vertical, wherein for an example the second and third surfaces 314, 316 may be perpendicular with a plane formed by the x and y-axes.

The valve block 304 may use a one or more valves to actuate the actuator 302. When the one or more valves actuate the actuator 302, the piston 308 may be driven to slide axially with respect to the axis 306. The valve block 304 may be driven by two or more three way valves. If using three-way valves, at least two three-way valves may fluidly couple to and drive the valve block 304 and actuator 302. In one example, a first valve 322 and a second valve 324 may be fluidly coupled to the valve block 304 via openings in the fourth surface 318. The first valve 322 and second valve 324 are shown schematically and may have dimensions and features that differ from those than shown in view 300. The first and second valves 322, 324 may be solenoid valves, such as solenoid pressure proportional valves, that use a solenoid to actuate and change the pressure of a fluid to the valve block 304. The first valve 322 may be of the same dimensions and model as the second valve 324. For this example, the first valve 322 and second valve 324 may be three-way valves.

For an alternative configuration of actuator 302, the valve block 304 may be driven by one or more four-way valves. If using four-way valves, there may be at least a single four-way valve that may fluidly couple to and drive the valve block 304 and actuator 302. For this example, the valve may be a solenoid valve, such as a solenoid pressure proportional valve.

The hole 310 may have a first mouth 326 formed from a surface. For one example the surface may be the second surface 314. A centering spigot of a transmission, such as transmission 56, may be positioned to be concentric to the hole 310. The hole 310 may have a first mouth 326 formed from second surface 314. The first mouth 326 may be approximately circular with a first diameter 327. The first diameter 327 may be the first diameter of hole 310. Fluid passages fluidly coupled to hole 310 may be positioned asymmetrically throughout the material of the valve block 304. The hole 310 may have a diameter that varies at different positions axially, with respect to the axis 306. The hole 310 may be divided into a plurality of portions that are conical and cylindrical in shape.

The hollow portion of the piston 308 may be comprised of a hole 328. The hole 328 may be a pass-through hole formed through the piston 308. The hole 328 may be concentric to the piston 308 and approximately centered on the axis 306. The axis 306 may be collinear with the centerline of the hole 328 and the piston 308. The hole 328 may act as a hollow cavity that may be located about and support a rod. The hole 328 may be divided into a plurality of portions that are cylindrical in shape.

A first hole 332 and a second hole 334 may be formed in the material of the valve block 304. For an example of one embodiment, the first hole 332 and second hole 334 may be located in the third surface 316. The first hole 332 and second hole 334 extend through the material of the valve block 304 and may be coupled to a plurality of passages enclosed by the valve block 304. The first hole 332 may be used to supply pressure to the passages of the valve block 304 and the components of the actuator, such as the piston 308. The first hole 332 may be fluidly coupled to a source of pressure external to the valve block 304. The first hole 332 may act as a supply of pressure for the first and second valves 322, 324. The second hole 334 may be used to supply an actuation fluid, such as oil, to the first and second valves 322, 324. The second hole 334 may be fluidly coupled to a reservoir of actuation fluid external to the valve block 304. The second hole 334 may therein supply actuation fluid to the passages of the valve block 304 and components of the actuator 302, such as the piston 308.

A third hole 336 and a fourth hole 338 may be formed on a surface of valve block 304. For an example of one embodiment, the third hole 336 and the fourth hole 338 may be formed on the second surface 314. The third hole 336 and fourth hole 338 may be used to mount the valve block 304 to a component of a vehicle, such as the transmission 56 or gearbox 70 with reference to FIGS. 1-2.

The actuator 302 may be divided by a plane 360. A sectional view taken on plane 360 is illustrated and described in more detail below with reference to FIG. 4.

Turning to FIG. 3B, it shows the first view 300 of the actuator 302 with internal passages, components, and other features enclosed by the valve block 304. Features enclosed by the valve block 304 may be represented with dashed lines.

The hole 310 may extend through the material of the valve block 304 between two surfaces on opposite sides of valve block 304. For an example of one embodiment, hole 310 may extend to a surface of the valve block 304 on the opposite side of a plane 360 from the second surface 314. Hole 310 may be formed into the valve block 304 via boring. For some embodiments hole 310 may be a blind hole.

The third hole 336 and the fourth hole 338 may extend from the second surface 314 through the material of the valve block 304 to the surface on the opposite side of plane 360 from the second surface 314. A component such as a rod or a fastener may be inserted into the third hole 336 and/or fourth hole 338 to mount the valve block 304 to a component or feature of the transmission, gear box, or another component of the vehicle. The transmission may be transmission 56 and the vehicle may be vehicle 5 with reference to FIGS. 1-2. For this example, there may be at least two fasteners, with one of each complementary to the third hole 336 and/or fourth hole 338.

The valve block 304 may enclose a plurality of passages, that may act as fluid passages and be used to route actuation fluid, such as oil, to different regions of the valve block 304. Such fluid passages may include a second passage 372, a third passage 374, a fourth passage 376, and a fifth passage 378. A plurality of caps 382 may be used to seal passages that may fluidly couple to surfaces of the valve block 304, such as second passage 372, third passage 374, fourth passage 376, and fifth passage 378.

One or more adduction lines between the valve and the hydraulic cylinder are configured to allow the hydraulic cylinder to be self-purging. The adduction lines may include of all channels or passages that are fluidly coupled between the regulated port of a valve cavity and the hydraulic cylinder of hole 310. In general, to be self-purging, an adduction line may be no more than ten percent of the volume displaced by the full stroke of the piston 308. For example, adduction lines, such as the second passage 372, the third passage 374, and so on, may be no more than ten percent the volume of the actuator displacement to allow the hole 310 and the adduction lines to be self-purging of air or other gases that may form bubbles or pockets.

Turning to FIG. 4, it shows a sectional view 400 of the actuator 302. Sectional view 400 may be taken on plane 360 with reference to FIG. 3B. Sectional view 400 may be from the perspective along the axis 306 from on the opposite side of the actuator 302 from second surface 314.

Sectional view 400 shows the hole 310 may have an inner surface 410. Inner surface 410 may be approximately cylindrical at various sections and centered about the axis 306. There may be a clearance 412 between the inner surface 410 and the piston 308. Clearance 412 may be a radial clearance located radially, with respect to axis 306, about the piston 308.

A first line 414 may divide the hole 310 and piston 308 into approximately symmetrical halves. The first line 414 may be counter axial and intersect with the axis 306. A sectional view taken on line 414 is illustrated and described in more detail below with reference to FIG. 5. For this example, the sectional view of FIG. 5 may be taken on a plane formed on line 414 that is parallel with a plane formed by the x and y axes.

Sectional view 400 shows the valve block 304 has a fifth surface 416 opposite to the third surface 316.

A single or a plurality of valve cavities may be machined or formed on the same surface of the valve block 304. A single or a plurality of valve cavities of block 304 may be fluidly coupled to the first hole 332 and second hole 334. The number of valve cavities may be limited by the number of valves used for an embodiment. For an embodiment that uses a four-way valve, there may be at least one valve cavity. For an embodiment that uses a plurality of three-way valves, there may be at least two cavities.

For an example of one embodiment of valve block 304, the valve block 304 may incorporate a first valve cavity 418 and a second valve cavity 420 that may fluidly couple to valves, such as the first valve 322 and second valve 324 with reference to FIGS. 3A-B. The first valve cavity 418 and second valve cavity 420 may each have a first port that fluidly couples to the first hole 332 for supply of actuating fluid from a tank. The first valve cavity 418 and second valve cavity 420 may each have a second port that fluidly and/or pneumatically couples to second hole 334 for pressure from a pressure supply. For an example of one embodiment, the first valve cavity 418 may be approximately centered about a first axis 406a. For this example, the second valve cavity 420 may be centered about a second axis 406b.

The sectional view 400 shows the second passage 372 and third passage 374 may be in fluid communication with the first valve 322 via a sixth passage 422. The hole 310 may be in fluid communication and fluidly coupled to the first valve cavity 418 via the second passage 372 and the sixth passage 422. The sixth passage 422 may act as a fluid passage. The second passage 372 and sixth passage 422 may act as adduction lines.

The sectional view 400 shows the fifth passage 378 and an eighth passage 428 may be in fluid communication with the second valve cavity 420 via a seventh passage 424. The hole 310 may be in fluid communication and fluidly coupled to the second valve cavity 420 via the eighth passage 428 and the seventh passage 424. The seventh passage 424 and eighth passage 428 may act as fluid passages. The seventh passage 424 and eighth passage 428 may act as adduction lines.

For an example of one embodiment, the first valve cavity 418 may be formed of a first port 442, a first section 444, a second section 446, and a mouth 448. For an example of a second embodiment, the second valve cavity 420 may be formed of a first port 452, a first section 454, a second section 456, and a mouth 458. The first port 442 and first port 452 may fluidly couple to the sixth passage 422 and seventh passage 424, respectively. The first port 442 and first port 452 may each act as regulated ports for the first valve cavity 418 and second valve cavity 420, respectively. The first section 444 and first section 454 may each be fluidly coupled to a second port. The second port of the first section 444 may fluidly couple the first valve cavity 418 to the hole 332 and a supply of pressure. The second port of the first section 454 may fluidly couple the second valve cavity 420 to the hole 332 and a supply of pressure. The second section 446 and second section 456 may each be fluidly coupled to a third port. The third port of the second section 446 may fluidly couple the first valve cavity 418 to the second hole 334 and a supply of actuating fluid. The third port of the second section 456 may fluidly couple the second valve cavity 420 to the second hole 334 and a supply of actuating fluid. A valve may be inserted into the first valve cavity 418 and second valve cavity 420 via the mouth 448 and mouth 458, respectively.

One or more adduction lines between the valve and the hydraulic cylinder are configured to allow the hydraulic cylinder to be self-purging of air or other gases that may form bubbles or pockets. In general, to be self-purging, an adduction line may be no more than ten percent the volume of a hydraulic cylinder displaced by a full stroke. For example, the second the sixth passage 422, seventh passage 424, eighth passage 428, and so on may be no more than ten percent the volume of the hydraulic cylinder formed by hole 310 to allow the hole 310 and the adduction lines to be self-purging.

For an example of one embodiment, adduction lines shown in sectional view 400 includes the second passage 372 and the sixth passage 422, the seventh passage 424, and the eighth passage 428. The second passage 372 and sixth passage 422 may fluidly couple the hole 310 and the first valve cavity 418. The second passage 372 and sixth passage 422 may work in conjunction to deliver and/or remove fluid from the hole 310 and first valve cavity 418. The seventh passage 424 and eighth passage 428 may fluidly couple the hole 310 to the second valve cavity 420. The seventh passage 424 and eighth passage 428 deliver and remove fluid from the hole 310 and the second valve cavity 420.

Turning to FIG. 5, it shows a second sectional view 500 of actuator 302. The second sectional view 500 may be taken on line 414 with reference to FIG. 4. The second sectional view 500 may be viewed from below line 414 to a vertical axis. For this example, below may be with respect to the z-axis. View 500 shows a line 504 collinear with axis 306. A sectional view taken on line 504 is illustrated and described in more detail below with reference to FIG. 6A.

The second sectional view 500 shows the valve block 304 has a sixth surface 514 opposite to the second surface 314. The hole 310 may be of a first length 508 and the piston 308 may be of a second length 510. The hole 328 may extend the second length 510 and through the material of the piston 308. The first length 508 and second length 510 may be approximately axial with respect to the axis 306.

The hole 310 has a plurality of diameters, such as the first diameter 327 of the first mouth 326 and a fourth diameter 530 of a second mouth 526. The hole 310 may be of a second diameter 516, third diameter 518 or a diameter of a distance between the second and third diameters 516, 518. The first diameter 327 and fourth diameter 530 may be the same distance. Second diameter 516 and third diameter 518 may be less than the first diameter 327 and fourth diameter 530. The second diameter 516 may be greater than the third diameter 518.

The second mouth 526 may be located on an opposite side and mirrored over the plane 360 from the first mouth 326. The second mouth 526 may be of approximately the same dimensions to the first mouth 326. The first diameter 327 may mirror the fourth diameter 530 over the plane 360. The first diameter 327 of the first mouth 326 and the fourth diameter 530 of the second mouth 526 may be variable, changing in distance radially with respect to and at different points along axis 306. The first diameter 327 may increase in distance at positions further axially, with respect to the axis 306, away from the plane 360. The fourth diameter 530 may increase in distance at positions further axially, with respect to the axis 306, away from the plane 360. The variation in distance of the first and fourth diameters 327, 530 may form surfaces partially enclosed and formed by first and second mouths 326, 526, respectively. The aforementioned surfaces may be concave and radial with respect to the axis 306

A second plug 522 may be fit to the hole 310 and located about the piston 308. The second plug 522 may be centered about the axis 306 and on the opposite side of the plane 360 from the second plug 522. For an example embodiment, one of the plugs, either the first plug 320 or second plug 522, may be integral with the valve block 304. The aforementioned plug may be demanded to the valve block 304. For an alternative embodiment of actuator 302, hole 310 may be a blind hole of a smaller diameter that does not incorporate the plugs and incorporates only sealing elements.

The piston 308 may have an outer surface 531 and an inner surface 532. The outer surface 531 and inner surface 532 may be curved and circumferentially surround the axis 306. The piston 308 may have an inner diameter 528.

The hole 310 forms cylindrical portion that may act as a hydraulic cylinder for the piston 308. The cylindrical portion may be referred to herein as a cylinder 534. The cylinder 534 may drive and guide the piston 308 to slide axially with respect to axis 306. The first and second mouths 326, 526 may each form passages to the interior, or interior passages, through the valve block 304 to the cylinder 534. The cylinder 534 may be of the third diameter 518.

A ring 536 may extend radially, with respect to the axis 306, from the outer surface 531 of the piston 308. There may be a plurality of sealing members positioned about the piston 308, forming seals between the piston 308 and inner surface 410.

The ring 536 may have a groove 538 that supports a first seal 540. The groove 538 extends radially about and into the material of the ring 536, with respect to the axis 306. When about and supported by the groove 538, the first seal 540 may press and form a seal against the inner surface 410 of the cylinder 534. The seal formed between the inner surface 410 and seal 540 may be fluid tight.

The first plug 320 may be positioned between the first mouth 326 and the cylinder 534, with respect to the axis 306. The second plug 522 may be positioned between the second mouth 526 and the cylinder 534, with respect to the axis 306. The first plug 320 and second plug 522 may be axisymmetric with respect to the axis 306.

The ring 536 may be centrally located and act as a central ring with respect to the axis 306 and cylinder 534. The ring 536 may divide the cylinder 534 into a first chamber 541a and a second chamber 541b. The first chamber 541a and second chamber 541b may act as pressure chambers. There may be one or more pressure chambers formed between the piston 308 and inner surface 410. When piston 308 is driven axially with respect to axis 306 toward the first plug 320 in a full stroke, the first chamber 541a may be fully reduced and there may be only a second pressure chamber in the form of second chamber 541b. When piston 308 is driven axially with respect to axis 306 toward the second plug 522 in a full stroke, the second chamber 541b may be fully reduced and there may be only be a first pressure chamber in the form of first chamber 541a. The combined volume of the first chamber 541a and second chamber 541b may be approximately the total volume displaced by the piston 308 in a full stroke.

The actuator 302 may be double-acting type, wherein actuation fluid may act on either side of the ring 536 to drive the piston 308. There may be at least a first passage fluidly coupled to a first pressure chamber and a second passage fluidly coupled to a second pressure chamber formed on opposite sides of the ring 536. For an example of an embodiment, the first chamber 541a may be fluidly coupled to the fourth passage 376 and eighth passage 428. For this example, the second chamber 541b may be fluidly coupled to second passage 372. Additionally, there may be another passage on the opposite side of a plane formed on axis 306 with the z-axis from second passage 372. This aforementioned passage may be fluidly coupled to the second chamber 541b. Actuation fluid may be pumped into and removed from the first chamber 541a via the eighth passage 428. Actuation fluid may be pumped into and removed from the second chamber 541b via the second passage 372. The second passage 372 and eighth passage 428 may act as adduction lines that deliver and/or remove fluid to translate the piston 308 in a direction approximately collinear with the axis 306.

For example, when actuation fluid is pumped to increase pressure to the first chamber 541a, the ring 536 and piston 308 may translate in a first direction toward the second plug 522. As the piston 308 translates in a first direction, actuation fluid may be removed from the second chamber 541b via the second passage 372.

For another example, when actuation fluid is pumped and/or the pressure is increased to the second chamber 541b, the ring 536 and piston 308 may translate in a second direction toward the first plug 320. As the piston 308 translates in a first direction, actuation fluid may be removed from the second chamber 541b via the eighth passage 428.

For these example, the eighth passage 428 may act as a first passage fluidly coupled to the first chamber 541a, and the second passage 372 may act as a second passage fluidly couple to the second chamber 541b.

A second seal 542, a third seal 544, and a fourth seal 546 may be located radially, with respect to the axis 306, about the piston 308. A second seal 542 may be located about and supported by a first groove 552 of the first plug 320. A third seal 544 may be located about and supported by a second groove 554 of the second plug 522. The second seal 542 and third seal 544 may press and form seals against the inner surface 410. The second seal 542 and first plug 320 may act collectively as a sealing member between the piston 308 and inner surface 410. The third seal 544 and second plug 522 may act collectively as a sealing member between the piston 308 and inner surface 410. The fourth seal 546 may be partially enclosed and supported by a third groove 556. The first and second grooves 552, 554 may be located radially about, with respect to the axis 306, the first and second plugs 320, 522, respectively. The third groove 556 extends radially, with respect the axis 306, into the inner surface 410. The second seal 542, third seal 544, and fourth seal 546 may be elastic seals and ring shaped, such as O-ring seals.

A fifth seal 548 and a sixth seal 550 may be located radially about the piston 308, with respect to the axis 306. The fifth seal 548 and sixth seal 550 may each be a v-seal. The fifth seal 548 may be partially enclosed and supported by a fourth groove 558a. The sixth seal 550 may be partially enclosed and supported by a fifth groove 558b. The fourth groove 558a may extend radially, with respect to the axis 306, into and be partially enclosed by the first plug 320. The fifth groove 558b may extend radially, with respect to the axis 306, into and be partially enclosed by the second plug 522. The second seal 542, fifth seal 548, and first plug 320 may act collectively as a sealing member between the piston 308 and inner surface 410. The third seal 544, sixth seal 550, and second plug 522 may act collectively as a sealing member between the piston 308 and inner surface 410.

A first guide ring 560 and a second guide ring 562 may be located about the piston 308. The first guide ring 560 may be partially enclosed and supported by a sixth groove 564. The second guide ring 562 may be partially enclosed and supported by a seventh groove 566. The first and second guide rings 560, 562 may be in surface sharing contact with the piston 308. The first and second guide rings 560, 562 may prevent direct contact between the outer surface 531 and the surfaces of the first and second plugs 320, 522, respectively. The sixth groove 564 may extend radially, with respect to the axis 306, into and be partially enclosed by the first plug 320. The seventh groove 566 may extend radially, with respect to the axis 306, into and be partially enclosed by the second plug 522.

The fourth seal 546, fifth seal 548, and sixth seal 550 may be in surface sharing contact with, press against, and form seals with outer surface 531. The first plug 320 and second seal 542, and the fifth seal 548 may prevent actuation fluid from leaking axially, with respect to the axis 306, past the first plug 320 into the first mouth 326. The second plug 522 and third seal 544, and sixth seal 550 may prevent actuation fluid from leaking axially, with respect to the axis 306, into a region between the second plug 522 and fourth seal 546.

The piston 308 may have a third mouth 568a and a fourth mouth 568b open to the hole 328. The third mouth 568a and fourth mouth 568b may be of the same dimensions and features. In one example, the third mouth 568a may be located closest to the second surface 314. The third mouth 568a may be extended approximately axially, with respect to the axis 306, at a distance 570 from the second surface 314 and first mouth 326. For this example, the fourth mouth 568b may be located closest to the sixth surface 514. The fourth seal 546 and second mouth 526 may be located approximately radially about the fourth mouth 568b, with respect to the axis 306. The fourth seal 546 may be in surface sharing contact with a section of the outer surface 531 about the fourth mouth 568b.

The first plug 320 and second plug 522 may have a first surface 572 and a second surface 574 respectively that recede from the inner surface 410 of the hole 310 toward the axis 306. The first surface 572 and second surface 574 may be angled away from the inner surface 410 at an angle greater than 0 and less than 90 degrees, such as 45 degrees. The material of the first plug 320 bounded by the first surface 572 may have a diameter 576 that is variable, wherein the diameter may increase closer and decrease further from the first groove 552 with respect to the axis 306. The material of the second plug 522 bounded by the second surface 574 may have a diameter 578 that is variable, wherein the diameter 578 may increase closer and decrease further from the second groove 554 with respect to the axis 306.

The first plug 320 may have a first land 580 located axially, with respect to axis 306, between the first groove 552 and the first mouth 326. The second plug 522 may have a second land 582 located axially, with respect to axis 306, between the second groove 554 and the second mouth 526. The first land 580 may be exposed to air. The second land 582 may face and be sealed from air by the fourth seal 546. The first land 580 may be fit to an eighth groove 584. The second land 582 may be fit to a ninth groove 586. The eighth and ninth grooves 584, 586 may extend radially, with respect to the axis 306, into the inner surface 410 of the hole 310. The first land 580 may be where the diameter 576 of the first plug 320 is at a maximum. The second land 582 may be where the diameter 578 of the second plug 522 is at a maximum. The eighth and ninth grooves 584, 586 may have the same dimensions, such as the same diameter. First land 580 and eighth groove 584 may prevent the first plug 320 from being dislodged from the hole 310 or moving in an axial direction, with respect to the axis 306, without a deliberate force. The second land 582 and ninth groove 586 may prevent the second plug 522 from being dislodged from the hole 310 or moving in an axial direction, with respect to the axis 306, without a deliberate force.

Turning to FIG. 6A, it shows the actuator 302 fastened to a rod 610 in a third sectional view 600. The third sectional view 600 may be taken on the line 504 with reference to FIG. 5. For this example, the third sectional view 600 may be taken on a plane on line 504 that is parallel with a plane formed by the y and z axes. The actuator 302 and a rod 610 may be positioned between a first side 602 and a second side 604. For example, the second surface 314 may be positioned closest to the first side 602 and the sixth surface 514 may be positioned closest to the second side 604.

The piston 308 may host the rod 610, wherein the rod 610 may be partially enclosed, and fastened to the piston 308. The rod may 610 may have a first end 612 and a second end 614. The actuator 302 and piston 308 may be of a pass-through design, such that the rod 610 may extend through hole 328. The first end 612 and second end 614 may each protrude from and extend beyond opposite sides of the piston 308 when rod 610 is housed in hole 328. When rod 610 is housed in the hole 328 and piston 308 is housed in the valve block 304, the first end 612 and second end 614 may each protrude from and extend beyond opposite sides of the valve block 304. The pass-through design of actuator 302 and piston 308 allows first end 612, second end 614, and other portions of rod 610 not enclosed by the actuator 302 to be acted on by components external to the actuator 302. The pass-through design of the actuator 302 may allow for manual operation of the rod 610 from at least one of the ends. An example of one embodiment, the first end 612 may extend from the fourth mouth 568b and second mouth 526 toward the second side 604. For this example, the second end 614 may extend from the third mouth 568a and first mouth 326 toward the second side 604.

The first end 612 may face and extend toward and be enclosed by a transmission, such as transmission 56. The first end 612 may be concentric to a centering spigot acting as a component of the transmission. The centering spigot of a transmission, such as transmission 56, may approximately center the rod 610 about axis 306. The centerline of the rod 610 may be approximately collinear and center with the centerline of the hole 328 and piston 308. The centering spigot may be located radially about the rod 610 on a portion of the first end 612. The second end 614 may be acted on for emergency manual operations, such as for towing purposes. The second end 614 may be operated manually by and be drivingly coupled to a component external to the actuator 302.

The rod 610 may have portions inserted into and extended through the hole 328. The rod 610 may be approximately centered on the axis 306 and have portions pass through the valve block 304. The axis 306 may be collinear with the centerline of the rod 610. The rod 610 may be a shifting rod, such as rod 224 with reference to FIGS. 2A-B. The rod 610 may not be guided by the piston 308. The rod 610 may be guided solely by a housing and components of a transmission, such as transmission 56 with reference to FIGS. 1-2.

A plurality of fasteners 620 may be used to fasten the second valve 324 to the valve block 304. The fasteners 620 or fastener of the same dimensions may be used to fasten the first valve 322 to the valve block 304. At least one of a fastener 620 may be used to fasten the first valve 322 and or second valve 324 to the fourth surface 318. Each of the fasteners 620 may be inserted through a first complementary hole 623 in a platform 624. There may be a plurality of first complementary holes 623 in each platform 624. There may be a plurality of platforms 624, wherein each of platforms 624 may formed on the first valve 322 and/or the second valve 324. Each of the fasteners 620 may be inserted through the first complementary holes 623 into a plurality of second complementary hole 628 in a surface of valve block 304. For an example of one embodiment, there may be a plurality of second complementary holes 628 that extend perpendicular to and through the fourth surface 318. The first and second complementary holes 623, 628 may have a threading complementary to a threading formed about the fasteners 620.

A clearance 630 may be formed between the rod 610 and the inner surface 532 of the piston 308. Clearance 630 may be a radial clearance that may be located radially, with respect to axis 306, about the rod 610. The design of the actuator 302 and piston 308 allows for a fastening device to be positioned between the rod 610 and the piston 308, such that the rod 610 may be fastened to the piston 308. The fastening device may prevent the actuator 302 and piston 308 from sliding axially, with respect to axis 306, about the rod 610. Likewise, features of the rod 610, the actuator 302, and the piston 308, may fasten the rod 610 to the piston 308. Additionally, these features may prevent the actuator 302 and piston 308 from sliding axially, with respect to axis 306, about the rod 610.

For example, the piston 308 may have a surface near the second end 614 for which a fastener may abut. Likewise, the rod 610 may be modified to include a groove to support a fastener. A clip referred to herein as a circlip 622 may act as the fastener describe above used to secure an end of the rod 610. The circlip 622 may be approximately circular and ring like in shape. The circlip 622 may fasten the piston 308 to the rod 610. The circlip 622 may be located about and coupled to the groove 626, such that the circlip 622 may extend radially, with respect to the axis 306, from the groove 626. The circlip 622 and groove 626 may be located about an end of the rod 610. For an example of an embodiment, the circlip 622 and groove 626 may be located about and protrude from the second end 614.

The clearance 630 may be at least a first minimum distance when the rod 610 is concentric to hole 328 of piston 308. For an example of one embodiment, the clearance 630 may be at least a minimum distance of 0.5 mm when the rod 610 is concentric to hole 328 of piston 308. When misaligned, not concentric to the hole 328, the clearance 630 may be of a second minimum distance. For an example of one embodiment, when the rod 610 is not concentric to the hole, the clearance 630 may be no less than a distance of 0.1 mm.

The clearance 630 may allow the piston 308 to remain aligned with the cylinder 534, such that the piston 308 remains concentric to the cylinder 534 and centered about axis 306. If the rod 610 became approximately misaligned from the axis 306, the piston 308 may remain aligned with the cylinder 534. Deflection or other uneven forces that may affect the position of the rod 610 may not affect the position of the cylinder 534 relative to the axis 306. The clearance 630 may allow the rod 610 to be moved out of alignment without affecting the alignment of the piston 308 relative to axis 306. Forces that affect the rod 610, such as deflection, may not apply or procure any radial load to the piston 308, even if the rod 610 is moved out of alignment. The clearance 630 may therein allow the tolerances for the dimensions of the rod 610, the piston 308, and other components of the actuator 302 to be relaxed.

In an example of an embodiment, the rod 610 may be comprised of a first portion 632, a second portion 634, a third portion 636, a fourth portion 638, and a fifth portion 640. The first portion 632 may be partially enclosed by the valve block 304. The piston 308 may be located about and circumferentially surround the first portion 632. The second portion 634, third portion 636, and fourth portion 638 may extend from the first portion 632 and away from the fourth seal 546 and second mouth 526. The second portion 634, third portion 636, and fourth portion 638 may extend approximately axially, with respect to the axis 306, toward the second side 604. The second portion 634, third portion 636, and fourth portion 638 may form into the first end 612. The fifth portion 640 may extend from the first portion 632 and away from the circlip 622. The fifth portion 640 may extend approximately axially, with respect to the axis 306, toward the first side 602. The fifth portion 640 may form into the second end 614.

A hole 644 may be formed from the fourth portion 638 and be approximately centered on the axis 306. The hole 644 may be used to couple the rod 610 to a component of a transmission, such as an arm, such as a shifting fork. A plurality of holes 646 may be formed from the third portion 636. The holes 646 may extend through the material of the third portion 636 and have lengths 648 be approximately perpendicular to axis 306. The holes 646 may house arms or appendages, such as shifting forks, used to shift gears or reducers.

The first portion 632 may be of a first diameter 652. The second portion 634 may be of a second diameter 654. The second diameter 654 may be larger than the first diameter 652. The difference in diameter between the first and second portions 632, 634 may create a shoulder 656. The shoulder 656 may abut a surface 658 of the piston 308. The shoulder 656 may prevent the second portion 634 from moving axially, with respect to the axis 306, past surface 658 toward the first side 602. Surface 658 may extend radially from the hole 328 and be approximately perpendicular with respect to the axis 306.

A centering spigot of a transmission may be positioned radially, with respect to axis 306, between the second mouth 526 and the second portion 634. The central axis of the rod 610 and the central axis of the hollow piston 308 may be approximately concentric to the centering spigot, wherein approximately for one example may be specified by a difference of +/−0.2 mm. The centering spigot may be in surface sharing contact with and concentric to the second mouth 526. For an example of one embodiment, the third seal may form a seal against the centering spigot The circlip 622 may abut a surface 660 of the piston 308. Surface 660 may extend radially from the hole 328 and be approximately perpendicular with respect to the axis 306. Surface 658 and surface 660 may be of approximately the same dimensions mirrored over the plane 360. The groove 626 may form a shoulder for the circlip 622 to abut. When supported and coupled by the groove 626, the circlip 622 may abut a surface 660 of piston 308. The circlip 622 may prevent the actuator 302 from sliding axially, with respect to axis 306, about the rod 610 in the direction of the first side 602. Likewise, the groove 626 may act as an abutment for the circlip 622 that may prevent the rod 610 from sliding axially, with respect to the axis 306, from hole 328 toward the first side 602. The circlip 622 and surface 660 may also prevent the rod 610 from sliding axially, with respect to the axis 306, from hole 328 toward the second side 604.

When the circlip 622 abuts the surface 660 and the shoulder 656 abuts the surface 658, the rod 610 may be fastened to the piston 308. When fastened, the rod 610 and piston 308 may act as a single unit. The circlip 622 may prevent the piston 308 from sliding axially, with respect to axis 306, over the surface of the rod 610 past circlip 622 and toward the second end 614. The circlip 622 may also prevent the sliding of the rod 610 axially, with respect to axis 306, and independently of the piston 308 toward the second side 604. Likewise, the shoulder 656 may prevent the piston 308 from sliding axially, with respect to axis 306, over the surface of the rod 610 past shoulder 656 and toward the second end 614. The shoulder 656 may also prevent the sliding of the rod 610 axially, with respect to axis 306, and independently of the piston 308 toward the first side 602. There may be approximately no axial clearance, with respect to the axis 306, between the circlip 622 and the surface 660 when both abut. Likewise, there may be approximately no axial clearance, with respect to the axis 306, between the shoulder 656 and surface 658 when both abut.

FIG. 6B shows a fourth sectional view 670 of the actuator 302. The fourth sectional view 670 may be taken on the line 504 with reference to FIG. 5. The fourth sectional view 670 shows a closer perspective and additional details of the actuator 302. The example of the actuator 302 shown in the fourth sectional view is not fluidly coupled to valves or fastened with fasteners 620.

Turning to FIG. 7, it shows an example embodiment, of a section 700 of the piston 308 from an isometric perspective 701. Other embodiments of piston 308 may exist that are asymmetric with respect to the axis 306 but have different features and dimensions. The section 700 may be a half section of piston 308. The section 700 may be taken on line 504, with reference to FIG. 5, or by a plane taken on axis 306 and to plane 360, with reference to FIGS. 3A-B. Section 700 may be isolated from other components of the actuator 302.

The piston 308 may be of a first outer diameter 734. The first outer diameter 734 stretches between the sides of the outer surface 531. The piston 308 may have a second inner diameter 730 and a second outer diameter 736 about the third mouth 568a. The piston 308 may have a third inner diameter 732 and a third outer diameter 738 about the fourth mouth 568b. The ring 536 may be of a fourth outer diameter 740 and the groove 538 may be of a fifth outer diameter 741.

The second inner diameter 730 and third inner diameter 732 may be approximately the same distance. The second outer diameter 736 and third outer diameter 738 may be variable, wherein the second and third outer diameters 736, 738 may decrease in distance at points further from the ring 536 axially with respect to the axis 306. A first outer surface 742 may be located about the third mouth 568a. A second outer surface 744 may be located about the fourth mouth 568b. The first and second outer surfaces 742, 744 may be located radially with respect to axis 306. The decrease in the second and third outer diameters 736, 738 give the first outer surface 742 and second outer surface 744, respectively, semi conical shapes.

Thus, disclosed herein is an actuator that may be used to translate a shifting rod for a transmission. The actuator is stand-alone. The actuator may be assembled and operated separately from the transmission. The actuator may be hydraulic and double-acting type actuator. The actuator may incorporate a valve block, wherein the valve block may be a stand-alone block. The valve block may be assembled and form a cylinder about a piston. The piston may be centered on and translate axially with respect to a central axis of the cylinder. The valve block may be fluidly coupled to a single or a plurality of valves. For example, there may be only a single four-way valve or at least two three-way valves. The valve or valves may be a single or a plurality solenoid valves, such as solenoid pressure proportional valves. The valve or valves may be fluidly coupled and be in fluid communication with a plurality of adduction lines and other passages formed by the valve block. The adduction lines may fluidly couple and be in fluid communication with the hole and the cylinder of the valve block that may house the piston. The piston may be hollow such that the shifting rod may be inserted and partially enclosed by the hole of the piston. When inserted into the piston, a clearance may be formed between the outer surface of the shifting rod and the inner surface of the piston. The shifting rod may be fastened to the piston via a ring like and/or circular clip on a first end of the shifting rod and a shoulder formed by and located on the opposite end of the shifting rod.

It will be appreciated that the configurations and routines disclosed herein are exemplary in nature, and that these specific embodiments are not to be considered in a limiting sense, because numerous variations are possible. For example, the above technology can be applied to various transmission types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A stand-alone block, comprising:
a hydraulic cylinder and one or more valves, wherein one or more adduction lines between the one or more valves and the hydraulic cylinder are configured to allow the hydraulic cylinder to be self-purging, wherein the hydraulic cylinder drives and guides a hollow piston, wherein a pass-through hole of the hollow piston is configured to host a rod axially aligned with respect to a centerline of the hollow piston, wherein the hollow piston has a radial clearance formed between an inner surface of the hollow piston and the rod, wherein the hollow piston has a surface a distance from a hole that forms the hydraulic cylinder, wherein the surface is not enclosed by the stand-alone block, and wherein a circular clip is positioned about the rod and abuts the surface such that the rod is fastened to the hollow piston.

2. The stand-alone block of claim 1, wherein the stand-alone block is separate from a transmission housing and not housed by the transmission housing.

3. The stand-alone block of claim 1, wherein the hydraulic cylinder is of a double-acting type.

4. The stand-alone block of claim 1, further comprising a plurality of sealing members positioned about the hollow piston forming one or more pressure chambers between the hollow piston and an inner surface of the stand-alone block.

5. The stand-alone block of claim 1, further comprising at least two three-way valves, wherein the piston is driven by the at least two three-way valves.

6. The stand-alone block of claim 1, further comprising only a single four-way valve, wherein the piston is driven by the single four-way valve.

7. The stand-alone block of claim 1, wherein the one or more valves are a single or a plurality of solenoid valves.

8. A stand-alone block, comprising:
a hydraulic cylinder and one or more valves, wherein one or more adduction lines between the one or more valves and the hydraulic cylinder are configured to allow the hydraulic cylinder to be self-purging, wherein the hydraulic cylinder drives and guides a hollow piston, wherein a pass-through hole of the hollow piston is configured to host a rod axially aligned with respect to a centerline of the hollow piston, wherein the hollow piston has a radial clearance formed between an inner surface of the hollow piston and the rod, wherein the hollow piston is axisymmetric and includes a central ring having a groove that supports a first seal, wherein the groove extends radially about and into the central ring, with respect to a central axis of the rod, the first seal pressing against an inner surface of the hydraulic cylinder.

9. The stand-alone block of claim 8, further comprising a first plug and a second plug each coupled in the stand-alone block, wherein the first plug and second plug are axisymmetric.

10. The stand-alone block of claim 9, wherein one of either the first plug or second plug is integral with the block itself.

11. The stand-alone block of claim 8, wherein the hollow piston and actuator allows the rod to extend beyond opposite surfaces of the stand-alone block.

12. The stand-alone block of claim 11, wherein the rod has a groove allowing for a circular clip to be positioned about the rod to fasten the rod to the piston.

13. The stand-alone block of claim 8, wherein the stand-alone block is separate from a transmission housing and not housed by the transmission housing.

14. The stand-alone block of claim 8, wherein the hydraulic cylinder is of a double-acting type.

15. The stand-alone block of claim 8, further comprising a plurality of sealing members positioned about the hollow piston forming one or more pressure chambers between the hollow piston and an inner surface of the stand-alone block.

16. The stand-alone block of claim 8, further comprising at least two three-way valves, wherein the piston is driven by the at least two three-way valves.

17. The stand-alone block of claim 8, further comprising only a single four-way valve, wherein the piston is driven by the single four-way valve.

18. The stand-alone block of claim 8, wherein the one or more valves are a single or a plurality of solenoid valves.

19. A system, comprising:
a transmission; and
a transmission actuator comprising a stand-alone block, the stand-alone block including a hydraulic cylinder and a valve, wherein one or more adduction lines between the valve and the hydraulic cylinder are configured to allow the hydraulic cylinder to be self-purging, wherein the hydraulic cylinder drives and guides a hollow piston and a rod axially aligned with respect to a centerline of the hollow piston, wherein the hollow piston has a radial clearance formed between an inner surface of the hollow piston and the rod, wherein the stand-alone block further comprises a plurality of sealing members positioned about the hollow piston forming one or more pressure chambers between the hollow piston and an inner surface of the stand-alone block, and a circular clip that protrudes from an end of the rod, wherein the circular clip couples the rod to the hollow piston, wherein the clearance between the rod and the hollow piston is configured to enable the rod to be moved out of alignment with the centerline, and wherein a volume of the one or more adduction lines are no more than ten percent of a volume of a bore in the stand-alone block for the hollow piston and the hydraulic cylinder.

20. The system of claim 19, wherein the stand-alone block is separate from a transmission housing and not housed by the transmission housing.

* * * * *